United States Patent Office 3,304,204
Patented Feb. 14, 1967

3,304,204
CHEMICAL FORMATION OF POSITIVE NICKEL ELECTRODES
Claude J. Menard, St. Paul, Minn., assignor to Gould-National Batteries, Inc., a corporation of Delaware
No Drawing. Filed Oct. 2, 1963, Ser. No. 313,173
11 Claims. (Cl. 136—29)

This invention relates to the chemical formation of porous nickel electrodes and is particularly adapted for use in the manufacture of nickel-cadmium storage battery plates or electrodes. Such storage batteries have positive plates which embody a conductive matrix usually covered on both sides with porous sintered nickel plaques impregnated with the positive active material. One conventional impregnation procedure involves immersing the sintered porous nickel plaques in nickel nitrate, followed by electrolytic conversion of the nickel nitrate to nickel hydroxide. Such conversion is obtained by making the nitrate impregnated plaque the cathode in a hot caustic bath, e.g., a KOH or NaOH solution, between metallic anodes, and electrolyzing at a suitable current density. The nickel plates or plaques to be treated may be immersed in an aqueous solution of nickel nitrate or in a molten bath of nickel nitrate hexahydrate. It is also conventional procedure to accelerate the penetration of nitrate solution by maintaining a partial vacuum in the impregnating vessel and by heating to a suitable temperature, thereby filling the pores with nickel nitrate. It is usually necessary to repeat the impregnation procedure several times.

Another method for impregnating porous sintered nickel plaques or plates with nickel hydroxide is known as the thermal decomposition method. This involves impregnation of the plaques in a molten bath of nickel nitrate, roasting the plaque at a temperature of from 180° to 250° C. for a suitable period of time to decompose the nickel nitrate into a product intermediate between nickel nitrate and nickel hydroxide, and converting the intermediate product into nickel hydroxide by immersing the plaque in hot concentrated caustic solution, followed by washing and drying. This process also requires repeated immersion, roasting, immersion, washing and drying.

A conventional method forming porous positive plaques which have been impregnated with active material involves the following procedure:

(A) Charge the plaques for eleven to twelve hours at a rate, for example, of 0.0225 ampere per square inch.

(B) Discharge the plaques completely at a suitable rate such as 0.0155 ampere per square inch to 0 voltage plus an additional half hour. The total discharge time may be approximately ten hours.

(C) Wash the plaques in hot water for a minimum period of eight hours and make a phenol test for free KOH. When there is no indication of KOH washing is continued for at least two hours, and (D) Dry the plaques in the oven at approximately 80° C. for a minimum of forty-five minutes.

It will be evident that such electrolytic formation of plaques is time consuming and expensive. It is therefore, an object of the present invention to provide a simplified and more efficient process for forming positive electrodes. This invention is essentially a chemical process which is characterized by oxidation and reduction treatment of porous electrodes which have been impregnated with bivalent active material.

Other objects are to reduce the impurity content of positive electrodes and increase the capacity of the electrodes by chemical formation.

A further object is to chemically form a positive electrode by oxidizing the active material in a hypochlorite solution having alkalinity of a predetermined value followed by reduction treatment whereby the evolution of gas due to decomposition of hypochlorite is minimized, there is maximum utilization of the oxidizing agent, the temperature of the soluton at the start of oxidation may be approximately atmospheric temperature, and corrosion of the nickel by the products of oxidation is obviated.

A particular object is to chemically form porous nickel electrodes which have been impregnated with bivalent nickel positive active material, by oxidizing the active material in a hypochlorite solution of increased alkalinity followed by treatment of the electrode in a reducing alkaline alcohol solution and suitable washing and drying treatment.

According to my invention the formation of the positive nickel electrode is accomplished rapidly by chemical treatment which includes oxidation of the active material in the pores of the electrode followed by reduction treatment which completes the formation treatment. The positive active material, $Ni(OH)_2$, is oxidized to $Ni(OH)_3$ by soaking the electrode in an alkaline hypochlorite solution of specific concentrations of NaOCl and NaOH or KOH starting at room temperature. The reduction of $Ni(OH)_3$ to $Ni(OH)_2$ is then accomplished in an alkaline-alcohol solution also starting at room temperature. The most economical volume of the solution per square inch of plaque .025 inch thick is 4.6 cc.

For the oxidizing treatment a most effective concentration in practice consists of a solution of 9% to 10% NaOCl by weight (9.8 to 11.0 trade percent available chlorine, or 98 to 110 grams per liter available chlorine) with alkalinity of 4.5% to 6.5% NaOH by weight at an initial solution temperature of 30° C. plus or minus 2.5° C. Acceptable initial temperatures are in the range 20° to 35° C. (68° to 95° F.) with an alkalinity range from 4% to 7% sodium hydroxide or equivalent KOH over that temperature range.

The reducing solution may consist of one part of methanol to thirteen parts of 1% sodium hydroxide at an initial temperature of 20° to 35° C. The preferred times in the oxidizing and reducing solutions are 30 minutes and 10 minutes respectively. Such oxidation and reduction treatment is effective to improve the quality and capacity of the positive electrodes.

From numerous tests it has been determined that the rate of oxidation of the bivalent nickel hydroxide $Ni(OH)_2$ is a function of five conditions. These are (a) the concentration of the reactants NaOCl and $Ni(OH)_2$, (b) the alkalinity of the solution, (c) the initial temperature of the solution, (d) the soak time of the plates in the solution, and (e) the volume of solution relative to the plate area or the amount of $Ni(OH)_2$. For effective and economical oxidation the concentration, alkalinity, initial temperature, soak time and volume of solution relative to plate size must be controlled within narrow limits as hereinafter more fully pointed out. Effective reduction treatment may be accomplished with the alkaline-alcohol solution at any of a relatively wide range of temperatures and concentrations of the alkali and alcohol.

Most of the tests hereinafter described in detail were conducted with solution volumes of either 1.9 or 4.6 cc. per square inch of plates 0.025 inch thick. The experiments included a range of from about 1.9 to 9.2 cc. of liquid per square inch of plate, and the most effective volume was fixed at 4.6 cc. for economical reasons.

The degree of oxidation was determined by measuring the discharge time of the plate following its reaction in a specific condition of solution concentration, temperature and soak time. These measurements were made from several electrodes two square inches in size in fresh 25% KOH electrolyte after being oxidized in hypochlorite solution and rinsed four times in 25% KOH to wash out or dilute the hypochlorite. The discharge rate was 0.1 ampere, theoretically equal to approximately the three hour rate. The plates were discharged to 1.0 volt, as measured against a cadmium reference electrode. The extent of reduction was determined by measuring the state of charge of the electrode after being soaked in a specific reducing solution for a specific length of time. The electrode was placed in the reducing solution immediately following its oxidation in the hypochlorite solution.

*Effect of hypochlorite concentration at various temperatures on degree of oxidation*

The influence of hypochlorite concentration at various temperatures on the extent of oxidation was determined by plotting the highest measured discharge time at 0.1 ampere in minutes against temperatures where the plates had been soaked in NaOCl at various concentrations from 1.9% to 11.6% by weight. The plots show that the degree of oxidation is directly proportional to the hypochlorite concentration over a range of 1.9% to 11.6% NaOCl by weight and inversely proportional to the temperature above and below room temperature of 25° C. The alkalinites of the hypochlorite solutions in these tests were those of standard commercial solutions, with no KOH or NaOH added. Accordingly, the excess of caustic soda ranged from about .33% to about .76% by weight. The highest degree of oxidation was obtained at room temperature. At lower temperatures the oxidation rate is slower, while at higher temperatures the decomposition of hypochlorite to chloride and oxygen is greatly accelerated by the catalytic action of the nickel, thus resulting in lower states of oxidation of the electrodes. Corrosion of the plaques becomes apparent with increasing temperature and concentration of hypochlorite. Thus concentrations higher than about 12% NaOCl by weight with standard alkalinity are undesirable even at room temperature. Tests showed that an NaOCl concentration of 9% to 10% by weight at room temperature is optimal.

*Effect of soak time in hypochlorite solutions at various temperatures on degree of oxidation*

The effective soak time in hypochlorite solutions of various temperatures on degree of oxidation was determined by further tests. These tests show that there is an optimum soaking time in the hypochlorite for each temperature and that the soak time is inversely proportional to the temperature. The optimum soak times at 17, 25, 40, 60 and 80° C., for example, are approximately 40, 30, 10, 5 and 1 minutes respectively for a volume of solution per square inch of plate equal to 1.9 cc. The optimum soak time and temperature for the highest degree of oxidation was found to be 30 minutes at about 25 degrees C. When the optimum soak time is exceeded there is a reduction of the higher hydroxide of nickel $Ni(OH)_3$. Also, corrosion may occur through the coupling $Ni(OH)_3/KCl$ electrolyte/Ni, the reaction of which would be:

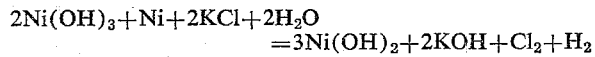

Accordingly, at any specific volume of solution and temperature it is desirable to limit the degree of oxidation of the electrodes by soaking them in the hypochlorite solution for a period of time slightly less than the optimum.

*Influence of alkalinity of hypochlorite solution on degree of oxidation*

The effect of the alkalinity of the solution on the degree of oxidation of the electrodes was studied by adding KOH or NaOH to the standard solutions. It was determined that the degree of oxidation may be increased if the alkalinity of the hypochlorite solution is higher than that of the standard solution, i.e., about .33% to about .76% by weight. Again the temperature of the solution is optimal at about 25° C.

The evolution of gas due to the decomposition of hypochlorite was apparently reduced by the addition of alkali, thus resulting in a greater utilization of the oxidizing agent and higher degree of oxidation. It was also found that the active material $Ni(OH)_2$ may be oxidized at higher temperatures up to 80° C. and 22–23% NaOH without apparent corrosion, to the same degree as that at room temperature if alkalinity of the solution is at least 15% by weight.

*Effect of alkalinity on soaking time in hypochlorite and concentration of solution*

Tests were run showing that the lower percentages of alkalinity should be used with the lower temperatures for best oxidation.

A further series of tests were run to shown the relationship between the alkalinity of the solution and the concentration of hyprochlorite over the desirable range of 9% to 10% NaOCl by weight. The preferred alkalinity for hyprochlorite solutions ranging from 9% to 10% NaOCl by weight is about 4% KOH (or the equivalent NaOH). However, the temperature rise of 10% to 15% observed with pilot quantities of plaques makes it necessary to increase the preferred alkalinity to 5% KOH, or equivalent NaOH, as a means to slow down the decompositions of the hypochlorite due to the temperature rise and in order to maintain the desired degree of oxidation. This alkalinity was found to be satisfactory over a soaking time of 30 to 40 minutes. Corrosion effects on the electrodes by the chloride often occured with longer soak time, e.g., 45 minutes. It was also noted that the alkalinity of the hypochlorite solution decreases slightly during the oxidation reaction, and that solutions of low alkalinities are very corrosive to the nickel plaque, the extend of corrosion increasing with the lowering pH. The corrosion may be due to the formation of hypro-chlorous acid (HOCl). The addition of alkali to the solution increases the pH and overcomes the slight decrease in alkalinity obserbed during the reaction, thus cutting down the corrosivity of the solution and the evolution of the chlorine.

*Influence of hypochlorite volume on oxidation*

The influence of hypochlorite volume on oxidation was also investigated. The tests hereinbefore described were obtained with 1.9 cc. of oxidation solution per square inch of plate. These additional tests were made for the 4.6 cc. of solution per square inch of plate, and were made at 27° C. for various soaking times in the solution. The alkalinity of each solution was 5% KOH. The optimum hypochlorite concentration was found to be about 9% to 10% with respect to the degree of oxidation and the optimum soak time was thirty minutes. Although longer soak times of thirty-five and forty minutes give higher states of oxidation, a thirty minute soak was found satisfactory and reduces greatly the chances of reduction of $Ni(OH)_3$ by the chloride. Soaks longer than 50 minutes may have corrosive effects at that hypochlorite concentration (9–10%) and final temperature of solution which is about 10° to 15° higher than the initial temperature. Reduction by the chloride is indicated by the drop in the degree of oxidation above 10% sodium hypochlorite and soaking time, 35 minutes.

*Reduction in alkaline-alcoholic solution*

As hereinbefore indicated, the preferred reducing agent is an alkaline-alcohol solution equivalent to one part of methanol ($CH_3OH$) to 13 parts 1% sodium hydroxide solution at room temperature. The heat of the reaction quickly raises the temperature of the solution from room to about 85° C., thus obviating the need for additional heat. It was found that higher concentrations of methanol and alkali than those above indicated did not affect the result. A soaking time of 10 minutes in the solution showed complete reduction of the higher nickel hydroxide. Shorter times of five minutes did not always reduce the hydroxide completely. Thus the reduction can take place in very little alcohol. Reaction of No(OH)$_3$ with formate or formaldehyde will also reduce the higher nickel hydroxide quite rapidly.

*Nitrate content of electrode for typical oxidation-reduction*

An important factor in the determination of value of a specific oxidation-reduction condition, aside from the measurements on the degree of oxidation and reduction, is the nitrate content of the formed electrode. Nitrate analyses were run for the various promising conditions of oxidation-reduction. The decrease in the nitrate content of the electrode following chemical formation is illustrated in Table 1 below for various typical initial nitrate contents.

TABLE 1.—SOME TYPICAL ELECTRODE NITRATE CONTENT [1] BEFORE AND AFTER CHEMICAL FORMATION

Type of plaque: 96 sq. in., .025 in. thick, 10.8A.H.
Oxidation: Thirty minutes in solution of 9 to 10% NaOCl by weight and 3.16 to 4.16% NaOH by weight (or 4.5 to 5.5% KOH equivalent) at initial temperature of 23 to 32° C. (73 to 90° F.).
Reduction: Room temperature solution of 1 p. Me OH=13 p. 1% KOH (or equivalent NaOH).
Volume of solution: 4.6 cc./sq. in. plate.

| Percent Nitrate | | Percent Nitrate | |
|---|---|---|---|
| Unformed Electrode | Formed Electrode | Unformed Electrode | Formed Electrode |
| 2.00 | 0.740 | [3] 0.501 | 0.155 |
| 1.80 | .186 | [3] .424 | .090 |
| 1.64 | .374 | .415 | .128 |
| 1.22 | .163 | .393 | .124 |
| [2] 1.01 | .073 | .387 | .054 |
| .751 | .065 | .377 | .088 |
| [3] .703 | .117 | .334 | .121 |
| [4] .690 | .200 | .308 | .073 |
| .654 | .019 | .302 | .118 |
| .577 | .131 | .275 | .131 |
| [3] .562 | .097 | .242 | .050 |
| [3] .543 | .132 | .221 | .121 |
| [2] .513 | .138 | .197 | .115 |

[1] Percent nitrate calculated without screen (production method of analysis includes screen, thus yielding lower value).
[2] Average value of four plaques.
[3] Average value of three plaques.
[4] Average value of six plaques.

It will be evident that the nitrate content after formation is independent of its initial value when the latter is less than about 1.2%. Nitrate contents were calculated from the weight of the active material and the nickel powder only, i.e., without the screen or other conductive support for the sintered plaques. This results in higher values than would be obtained when calculated by including the screen in the total weight. By this test standard of calculation it was found that cells of nitrate content 0.2% or less in the positive plaques give practical charge retention performance.

*Effect of alkalinity and temperature of hypochlorite on nitrate content of formed electrode*

Since it has been found that the temperature of the hypochlorite solution is a vital factor in the oxidation of the electrode, further studies were made over a room temperature range of 20 to 35° C. (68 to 95° F.). The alkalinity of the hypochlorite solution was also varied from about 3% to 7% NaOH by weight, since the rate of oxidation of nickel hydroxide is a function of the alkalinity and temperature of the hypochlorite solution. At constant temperature the degree of oxidation decreases with increasing alkalinity. Also, the degree of oxidation decreases at very low alkalinity as the decomposition of hypochlorite then becomes more pronounced. Also, the decomposition of hypochlorite increases with temperature at constant alkalinity. The decomposition may be slowed down at the higher temperatures by increasing the alkalinity of the solution. Thus at each temperature there is a condition of alkalinity that will give the best oxidation of the active material of the electrode with respect to its nitrate content and with no corrosive effect.

In this series of tests it was shown that there is an optimum alkalinity at each solution temperature for minimum nitrate content. However, the most desirable alkalinities must take into consideration other factors which contribute to the quality of the electrode. These factors are the concentration range of NaOCl which is 9 to 10%, practical temperature limits for any of these room temperatures and the practical alkalinity range for any of these room temperatures, and corrosion. Considering these factors, it was found that the desirable alkalinities at the various initial temperatures for 9% to 10% NaOCl solutions are as follows:

| Initial Temperature of Solution (° C.) | Desirable Alkalinity Range, Percent Na OH by Weight |
|---|---|
| 20 | 3.0–4.5 |
| 25 | 3.5–5.0 |
| 30 | 4.5–6.0 |
| 35 | 5.5–7.0 |

The rise in nitrate content at the higher temperature and low alkalinity is due to increasing decomposition of hypochlorite, resulting in a lower degree of oxidation. The rise in nitrate content above the optimum solution alkalinity is caused by a slower rate of oxidation and consequently a lower degree of oxidation at a constant reaction time. These tests show further that the nitrate content dropped slightly with increasing temperature from 20° to 35° C. at the desirable alkalinities. They also indicate that the desirable initial temperature of the solution would be about 30° C. (86° F.) with a solution alkalinity of 4.5% to 6.0% NaOH and that the temperature range should be between 27.5° and 32.5° C. (81.5° to 90.5° F.). An acceptable range of initial temperatures is 20° to 35° C. and a desirable alkalinity over that range of temperatures from 5% to 6.5% NaOH by weight was also indicated. It was found necessary to raise the value of the alkalinity of the solution over the same range of temperatures in order to slow down the decomposition of hypochlorite at a higher temperature and to prevent any attack on the plaques by the hypochlorite which could possibly occur at lower alkalinity and at 35° C.

This initial temperature range of solution (20° C. to 35° C.) is a most practical one in that it does not require heating or cooling at any time. However, it would tend to raise the nitrate content of the plate particularly at the low initial temperature, 20° C., and the high alkalinity, 6.5% NaOH of the solution.

*Sealed cell performance*

Extensive tests of my chemically formed electrodes in sealed cells have been made as a study of charge retention at room temperature and 130° F. It was observed that cells having positive electrodes formed chemically under the desirable conditions of oxidation and reduction had generally slightly higher capacities than those having positive electrodes formed electrically. However, the capacities of cells having chemically formed electrodes were no higher than unformed cells. This may indicate that there is no attack on the nickel plaque by the hypochlorite solution under desirable conditions of oxidation. Experimental observations support the conclusion that the slightly lower capacity for the electrically formed cells may be due in part to a greater loss of active material or also to the deposition on the plate of metallic impurities, such as iron, from the electrolyte during formation.

Since one of the main objectives of chemical formation is the removal of impurities from the electrodes, primarily nitrates, tests were run showing the capacity retentions at room temperature and 130° F. respectively.

In these tests the formation conditions were varied with respect to the initial temperatures, alkalinities and concentrations of hypochlorite. The nitrate content of the plates before formation was generally above average. Charge retention at both room temperature and 130° F. was found to be satisfactory. By plotting charge retention in percentage of full charge against days on open circuit it was found that the charge retention is a function of the nitrate content and that a nitrate content of about 0.15% by weight (calculated without screen) is indicated for a ninety day self-discharge period value of about 59% of full charge.

The hypochlorite solution used throughout the tests was commercial grade.

*Example of procedure*

Suitable apparatus for use in my process included a formation tank having conduits for supplying liquid to the tank and for draining the contents to waste. A rack and spacers for the plaques or electrodes in the formation tank were provided and suitable valves were interposed in the supply and drain conduits to control flow therethrough.

It may be assumed that the porous nickel electrodes to be formed have been impregnated with positive active material including an undesirable amount of nitrates. The successive steps of the forming process may be summarized as follows.

*Step 1.*—The plaques were unloaded from the impregnation rack of conventional impregnating apparatus and were placed in vertical position in the formation tank in spaced relation one to another so that the required volume of oxidation and reducing solutions (preferably equal to 4.6 cc. plus or minus 0.3 cc. per square inch of plaque) would be drawn into the pores of each plaque. The thickness of each spacer was at least 1/16 inch, and the tank dimensions and spacer thickness were such as to supply the required amount of solution between plaques.

*Step 2.*—The formation tank was filled with the oxidizing solution.

Alternate procedure for Steps 1 and 2:

(1) The formation tank may be filled with the oxidizing solution, and (2) The plaques may be lowered into the formation tank, and

*Step 3.*—The plaques were soaked in the oxidation solution for thirty minutes.

*Step 4.*—The solution was drained to waste.

*Step 5.*—The formation tank was filled with the reducing solution.

*Step 6.*—The plaques were soaked in the reducing solution for ten minutes.

*Step. 7.*—The solution was drained to waste.

*Step 8.*—The formation tank was filled with hot water (55° C. minimum).

*Step 9.*—The plaques were soaked for four plus or minus 0.5 minutes in the hot water.

*Step 10.*—The water was drained to waste.

*Step 11.*—The above Steps 8–10 were repeated until the products of reactions with the oxidation and reducing solution had been removed.

At this point the plaques may be treated to give them an anti-polar mass of cadmium by conventional or suitable treatment as for example, according to Patent No. 2,934,581.

*Step 12.*—Finally, the plaques were dried by placing the formation racks containing them in a drying oven until they were dry.

Potassium hypochlorite may be used in the oxidizing solution as a substitute for sodium hypochlorite. The effective conditions of use of potassium hypochlorite such as concentration, alkalinity, initial temperature and soak time are essentially the same as those herein described for oxidation of the plaques in sodium hypochlorite solutions. Essentially we are concerned in the oxidation reactions with the chlorine content of the hypochlorite solution. The concentration of KOCl expressed as percent of KOCl by weight is 10.95% to 12.16%.

To summarize, according to the present invention the most effective oxidizing solution is an aqueous solution of 9 to 10% NaOCl by weight (9.8 to 11.0 trade percent available chlorine, or 98 to 110 grams per liter available chlorine) with an alkalinity of 4.5 to 6.0% NaOH by weight at an initial solution temperature of 30 plus or minus 2.5° C. However, an acceptable initial temperature is 20 to 35° C. with an alkalinity ranging from 4.0 to 7.0% NaOH by weight over that temperature range. The most effective soak time in the solution is approximately 30 minutes an an effective volume of solution is 4.6 cc. per square inch of plate 0.025 inch thick.

Further, according to the present invention, the preferred reducing solution is an alkaline-alcohol solution equivalent to one part methanol ($CH_3OH$) to 13 parts of 1% NaOH at an initial temperature of 20 to 35° C. The preferred soak time in this reducing solution is 10 minutes and the volume of the solution is 4.6 cc. per square inch of plate 0.025 inch thick. For satisfactory capacity retention, the nitrate content of the positive plate should be kept below 0.20% $NO_3$ and is preferably less than 0.10% $NO_3$ (the screen or grid being excluded from the calculation). Such chemically formed positive electrodes, when used in sealed cells show charge retention at least as good as the cells with electrically formed positives. The sealed cell capacity is slightly higher with the chemically formed than with electrically formed electrodes.

I claim:

1. A process for chemically forming a porous nickel electrode, the pores of said electrode containing bivalent nickel hydroxide and impurities, which comprises:

(a) soaking said electrode in an alkaline aqueous hypochlorite oxidizing solution whereby the bivalent active material is converted to trivalent nickel hydroxide;

(b) soaking the electrode which has been subjected to said oxidizing treatment in a reducing alkaline-alcohol solution whereby said trivalent nickel hydroxide is reduced to nickel hydroxide, and (c) washing and drying the electrode so formed.

2. A process for forming a porous nickel electrode in accordance with claim 1 wherein said oxidizing solution is selected from the group consisting of solutions of sodium hypochlorite and potassium hypochlorite.

3. A process in accordance with claim 2 in which said oxidizing solution is an aqueous hypochlorite solution of concentration equivalent to 98 to 110 grams per liter of available chlorine.

4. A process in accordance with claim 3 in which the soaking of the electrode in said oxidizing solution is at an initial temperature of 20° to 35° C.

5. A process in accordance with claim 3 in which the soaking of the electrode in the hypochlorite solution is continued for a period of time sufficient to impregnate the electrode with approximately 4.6 cc. of said solution per square inch of electrode .025 inch thick.

6. A process for forming a porous nickel electrode in accordance with claim 3 in which the soaking time in said oxidizing solution is 30 minutes plus or minus 2½ minutes.

7. A process in accordance with claim 1 in which the concentration of said alkaline-alcohol solution is equivalent to 1 part of methanol ($CH_3OH$) to 13 parts of 1% NaOH and the initial temperature of the solution is 20° to 35° C.

8. A process in accordance with claim 7 in which the soak time in said reducing solution exceeds 5 minutes.

9. A method in accordance with claim 7 in which the soak time in said alkaline-alcohol solution is approximately ten minutes and the volume of solution is approximately 4.6 cc. per square inch of an electrode .025 inch thick.

10. A process for forming a porous nickel electrode in accordance with claim 1 in which said oxidizing solution as alkalinity within the range from 4% to 7% of Na(OH) by weight or equivalent.

11. A process for forming a porous nickel electrode in accordance with claim 1 in which said oxidizing solution has alkalinity within the range from 4% to 7% of sodium hydroxide (Na(OH)) by weight or equivalent and the concentration of the hypochlorite is the equivalent of 9–10% of NaOCl by weight (98 to 110 grams per liter of available chlorine).

References Cited by the Examiner

UNITED STATES PATENTS

| | | | |
|---|---|---|---|
| 2,631,115 | 3/1953 | Fox | 136—138 |
| 2,831,044 | 4/1958 | Bourgault et al. | 136—29 |
| 2,976,181 | 3/1961 | Brookshire. | |
| 3,031,517 | 4/1962 | Peters | 136—76 X |

OTHER REFERENCES

Falk, Journal of the Electrochemical Society, vol. 107, August 1960, pages 661–667.

WINSTON A. DOUGLAS, *Primary Examiner.*

B. J. OHLENDORF, *Assistant Examiner.*